(12) United States Patent
Jang et al.

(10) Patent No.: US 8,153,935 B2
(45) Date of Patent: Apr. 10, 2012

(54) FLUX CORED WIRE FOR DUPLEX STAINLESS STEEL AND METHOD OF MANUFACTURING THE SAME

(75) Inventors: Jong Hun Jang, Changwon-si (KR); Sang Jun Hur, Changwon-si (KR)

(73) Assignee: Kiswel Ltd., Busan (KR)

( * ) Notice: Subject to any disclaimer, the term of this patent is extended or adjusted under 35 U.S.C. 154(b) by 1208 days.

(21) Appl. No.: 11/875,620

(22) Filed: Oct. 19, 2007

(65) Prior Publication Data

US 2008/0093352 A1    Apr. 24, 2008

(30) Foreign Application Priority Data

Oct. 20, 2006  (KR) .................. 10-2006-0102590

(51) Int. Cl.
*B23K 35/02* (2006.01)
(52) U.S. Cl. .......... 219/145.22; 219/146.23; 219/146.31
(58) Field of Classification Search ............. 219/145.22, 219/146.23, 146.31, 146.1; 148/22, 23
See application file for complete search history.

(56) References Cited

U.S. PATENT DOCUMENTS

| | | | | |
|---|---|---|---|---|
| 3,418,179 A | * | 12/1968 | Raynes et al. ............ | 148/24 |
| 3,453,721 A | * | 7/1969 | Jayne ............ | 228/199 |
| 3,511,960 A | * | 5/1970 | De Haeck ............ | 219/73 |
| 3,986,899 A | * | 10/1976 | Kole et al. ............ | 148/24 |
| 4,017,339 A | * | 4/1977 | Okuda et al. ............ | 148/24 |
| 5,580,475 A | * | 12/1996 | Sakai et al. ............ | 219/145.22 |
| 6,124,569 A | * | 9/2000 | Bonnet et al. ............ | 219/146.1 |
| 6,140,607 A | * | 10/2000 | Kamada et al. ............ | 219/145.22 |
| 6,300,596 B1 | * | 10/2001 | Bonnet et al. ............ | 219/137 WM |
| 7,491,910 B2 | * | 2/2009 | Kapoor et al. ............ | 219/146.23 |
| 2001/0023863 A1 | * | 9/2001 | Bonnet et al. ............ | 219/137 WM |
| 2006/0144836 A1 | * | 7/2006 | Karogal et al. ............ | 219/146.1 |
| 2006/0219684 A1 | * | 10/2006 | Katiyar ............ | 219/145.22 |
| 2006/0219685 A1 | * | 10/2006 | Karogal et al. ............ | 219/145.22 |
| 2006/0272746 A1 | * | 12/2006 | Kapoor et al. ............ | 148/23 |

* cited by examiner

*Primary Examiner* — M. Alexandra Elve
(74) *Attorney, Agent, or Firm* — Saliwanchik, Lloyd & Eisenschenk

(57) ABSTRACT

A flux cored wire for duplex stainless steel and a manufacturing method thereof are provided. The flux cored wire can include a sheath and a flux filled into the sheath. The flux cored wire comprises about 24.0-30.0 wt % Cr, about 7.0-10.5 wt % Ni, about 2.0-4.0 wt % Mo, about 0.10-2.50 wt % Cu, about 0.40-1.00 wt % Si, about 1.5-3.0 wt % Mn, about 0.10-0.30 wt % N compound (converted value of N), and the remainder including Fe and inevitable impurities on the basis of the total weight of the wire. The flux comprises about 6.50-12.00 wt % of $TiO_2+SiO_2+ZrO_2+Al_2O_3$, about 0.10-0.50 wt % of $Li_2O+K_2O+Na_2O$, about 0.10-2.00 wt % of the other oxides, and about 0.10-0.50 wt % of metal fluoride (converted value of F) on the basis of the total weight of the wire. The flux can be filled into the sheath at a ratio of about 26-35%.

16 Claims, 3 Drawing Sheets

FLUX CORED WIRE FOR DUPLEX STAINLESS STEEL AND METHOD OF MANUFACTURING THE SAME

CROSS-REFERENCE TO RELATED APPLICATION

The present application claims the benefit under 35 U.S.C. §119 of Korean Patent Application No. 10-2006-0102590, filed Oct. 20, 2006, which is hereby incorporated by reference in its entirety.

BACKGROUND OF THE INVENTION

1. Field of the Invention

The present invention relates to a flux cored wire for duplex stainless steel, and more particularly, to a flux cored wire for duplex stainless steel and a method of manufacturing the same capable of obtaining corrosion-resistant materials which are used in seawater freshening equipment, oil refining equipment, petrochemical heat exchangers, and various chemical industrial equipment where high strength and excellent pitting corrosion resistance are required, and weld metal having excellent pitting corrosion resistance, intragranular corrosion resistance, cracking resistance, and high strength in welding structure materials of buildings or vehicles. Further, the flux cored wire can enhance welding performance and productivity owing to excellent drawability.

2. Description of the Related Art

Duplex stainless steel has excellent corrosion resistance, mechanical properties, and favorable welding performance, due to a characteristic of a minute structure thereof in which austenite and ferrite are composed at the ratio of 50:50. In early versions of duplex stainless steel, the amount of ferrite was 75-80%. This led to poor welding performance and intragranular corrosion resistance. Since the 1960s, as amounts of Cr and Ni were adjusted to maintain a compositional ratio of ferrite and austenite at 50:50, welding performance and intragranular corrosion resistance have been improved. In an actual weld zone, an amount of ferrite typically rapidly increases, thereby reducing mechanical properties and corrosion resistance of the weld zone. After that, duplex stainless steel including nitrogen (N), which is often referred to as third-generation duplex stainless steel, was developed. N is a very important component in a weld zone of duplex stainless steel and serves to help ferrite transform into austenite during cooling after welding. Accordingly, duplex stainless steel including N has better resistance to stress corrosion cracking, pitting corrosion, and intragranular corrosion than existing 300-series austenite stainless steel. In particular, the duplex stainless steel including N has a higher strength (as much as 50% higher) than existing austenite stainless steel, and a critical pitting temperature of the duplex stainless steel is higher (as much as 10 degrees Celsius or more) than existing SUS 316L stainless steel.

Examples of representative stainless steels including N include SUS304N2, SUS304LN, SUS316LN, SUS317LN, SUS329J3L, SUS329J4L, UNS S31803, UNS S32520, and UNS S32550. Stainless steel including N can be classified as austenitic stainless steel having a large amount of N and duplex stainless steel. Between them, the duplex stainless steel having high strength and excellent pitting corrosion resistance is generally used as a corrosion-resistant material in seawater freshening equipment, oil refining equipment, petrochemical heat exchangers, and various chemical industrial equipment. It is also used as a structure material of buildings or vehicles because of its high strength.

Weld materials used for welding in the above-described fields are required to have the same or more excellent physical properties than base metal. Furthermore, since favorable welding performance is required, MAG welding is typically required, and is performed using a flux cored wire with high efficiency and excellent welding performance among weld materials.

When duplex stainless steels are manufactured, heat treatment is performed after rolling. Therefore, it is easy to form a stabilized minute structure at a normal temperature. In a case of weld metal, however, it is not easy to control a change in minute structure, which occurs while the weld metal fused by welding is solidified by inherent cooling. Therefore, pitting corrosion resistance or toughness of the weld metal is more unstable than those characteristics of the duplex stainless steel. In a welding method of flux cored wire, since a heat input amount is high during welding, it is not easy to secure a relatively favorable weld zone, compared with gas tungsten arc welding (GTAW), gas metal arc welding (GMAW), and shielded metal arc welding (SMAW).

Moreover, when the flux cored wire is manufactured, a flux is filled into a sheath of stainless steel. Therefore, there is a limitation of an amount of alloy component which can be filled. In particular, most fluxes to be used for manufacturing the flux cored wire for duplex stainless steel are expensive. Additionally, as the amount of flux alloy component to be filled increases, the degree of work hardening increases. Therefore, cutting of a wire occurs during drawing, thereby causing a reduction in productivity, accompanied by an increase in cost of weld materials.

In research relating to this, amounts of alloy components such as chromium (Cr), nickel (Ni), molybdenum (Mo), and nitrogen (N) within a weld material are adjusted to secure pitting corrosion resistance, intragranular corrosion resistance, cracking resistance, and high strength of the weld metal and a weld zone, as well as favorable welding performance. In particular, it is known that the above-described alloy components can improve pitting corrosion resistance of the weld metal.

The effects of adding the above-described components can be changed according to a variation in welding heat input which is generated in a welding spot. Therefore, through only controlling the components, it is not sufficient to enhance pitting corrosion resistance of the weld metal. Also, an increase in the amount of the components added degrades mechanical performance of the weld metal or welding performance accompanied by a variation in welding heat input. Such an increase reduces drawability during manufacturing.

SUMMARY OF THE INVENTION

An object of the present invention is to provide a flux cored wire for duplex stainless steel which has excellent pitting corrosion proof, intragranular corrosion resistance, cracking resistance, and high strength, and exhibits favorable welding performance by controlling amounts of chromium (Cr), nickel (Ni), molybdenum (Mo), copper (Cu), and nitrogen (N) within the wire and optimizing combinations of components such as titanium oxide ($TiO_2$), silicon oxide ($SiO_2$), zirconium oxide ($ZrO_2$), aluminum oxide ($Al_2O_3$), lithium oxide ($Li_2O$), potassium oxide ($K_2O$), sodium oxide ($Na_2O$), iron carbonate ($FeCO_3$), manganese oxide (MnO), magnesium oxide (MgO), and bismuth oxide ($Bi_2O_3$) within a flux.

Another object of the present invention is to provide a flux cored wire for duplex stainless steel which enhances productivity by favorably adjusting the apparent density (grams per liter, g/L) of a flux and the particle size of a mixed flux and which can be manufactured at a low manufacturing cost.

In an embodiment, a flux cored wire for duplex stainless steel can include a sheath and a flux filled into the sheath. The flux cored wire can comprise about 24.0-30.0 wt % Cr, about 7.0-10.5 wt % Ni, about 2.0-4.0 wt % Mo, about 0.10-2.50 wt % Cu, about 0.40-1.00 wt % silicon (Si), about 1.5-3.0 wt % manganese (Mn), about 0.10-0.30 wt % N compound (converted value of N), and the remainder including iron (Fe) and impurities on the basis of the total weight of the wire. The flux can comprise about 6.50-12.00 wt % of $TiO_2+SiO_2+ZrO_2+Al_2O_3$, about 0.10-0.50 wt % of $Li_2O+K_2O+Na_2O$, about 0.10-2.00 wt % of other oxides, and about 0.10-0.50 wt % of metal fluoride (converted value of F) on the basis of the total weight of the wire. The flux can be filled into the sheath at a ratio of about 26-35%.

The total amount Po (%) of oxygen supplied by the oxides within the flux filled into the sheath, which is expressed by the following equation, can satisfy a range of about 3.00-5.20 wt % on the basis of the total weight of the wire:

$$Po = \sum_{i=1}^{n} (Xi \times \delta i),$$

where Po represents the total amount (%) of oxygen supplied by oxides within the flux filled into the sheath by the weight percentage (wt %) on the basis of the total weight of the wire, i represents an oxide within the flux filled into the sheath, n represents the number of oxides within the flux filled into the sheath, Xi represents the weight (%) of an oxide within the flux filled into the sheath by the weight percentage (wt %) on the basis of the total weight of the wire, and δi represents a percentage of oxygen atoms included in an oxide i within the flux.

In another embodiment, a method of manufacturing a flux cored wire for duplex stainless steel including a sheath and a flux filled into the sheath can include filling a mixed flux into a sheath. The apparent density of the mixed flux can range from about 3.50 g/L to about 4.50 g/L, and particles of the mixed flux can all pass through a 60-mesh standard sieve. The amount of particles of the mixed flux which do not pass through a 230-mesh standard sieve can range from about 65% to about 85% of the overall mixed flux, and the other particles can all pass through a 230-mesh standard sieve.

BRIEF DESCRIPTION OF THE DRAWINGS

Embodiments of the present invention will be more apparent from the following detailed description taken in conjunction with the accompanying drawings, in which.

DETAILED DESCRIPTION OF EXEMPLARY EMBODIMENTS

Figure 1A:
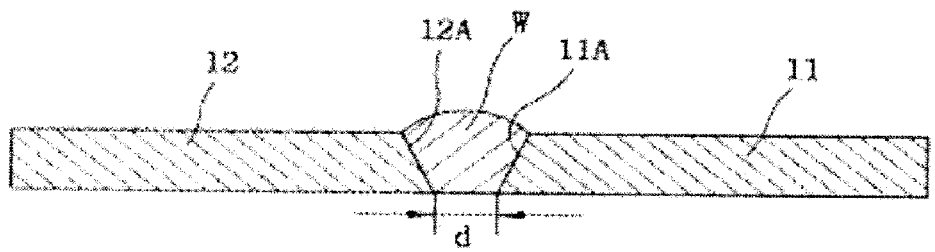
FIG. 1A is a schematic view showing welding in a flat position.

Hereinafter, exemplary embodiments of the present invention will be described in detail with reference to the accompanying drawings.

The present inventor has ascertained, through experiment, what effect the addition of chromium (Cr), nickel (Ni), molybdenum (Mo), and nitrogen (N) has on pitting corrosion resistance of weld metal. However, it is not sufficient to enhance pitting corrosion proof of weld metal by only controlling the elements. Also, increasing the amount of the elements added can degrade mechanical performance of weld metal or welding performance with a variation in welding heat input, and can reduce drawability during manufacturing.

Therefore, the present inventor has carried out research on a unit which improves cracking resistance and pitting corrosion resistance in addition to mechanical performance of weld metal or welding performance. The present inventor has evaluated the degree of effect caused by copper (Cu), silicon (Si), and manganese (Mn) and regulating the amount of microelement included in a sheath.

The present inventor has also discovered that an amount of oxygen supplied by an oxide within a flux filled into a sheath can have a large effect upon mechanical performance of weld metal and welding performance. The present inventor has carried out research on the amount of oxygen which can enhance welding performance while not substantially degrading mechanical performance of a weld zone.

The present inventor has examined the productivity and production cost of weld materials, which have been overlooked in the related art. To enhance productivity of products, as well as mechanical performance of weld metal and welding performance, the present inventor has performed various tests on the relationship between productivity and characteristics of flux filled into a sheath. As a result, the present inventor has found that factors having an important effect upon productivity, among the characteristics of flux, are apparent density (grams per liter, g/L) and particle size distribution of flux.

Hereinafter, reasons for limiting the amount of each element in a flux cored wire for duplex stainless steel according to the present invention and a reason for limiting a combination of various compositional elements will be described in detail.

The present inventor has researched correlations involving pitting corrosion resistance and cracking resistance. While austenitic stainless steels prescribed in JIS G4304 [Hot Rolled Stainless Steel Plates, Sheets and Strip], JIS G4305 [Cold Rolled Stainless Steel Plates, Sheets and Strip], JIS G4306 [Heat Rolling Stainless Steel], and JIS G4307 [Cold Rolled Stainless Steel] are used, the amount of carbon (C) is controlled to less than 0.015 wt %, and the total amount of phosphorous (P), sulfur (S), cobalt (Co), boron (B), and bismuth (Bi) is controlled to less than 0.10 wt % on the basis of the total weight of the sheath. As a result, the present inventor has found that there is an effect when certain compositional ranges are satisfied.

C: about 0.015 wt % or Less

C can enhance the strength of welding wire and deposited metal. As the amount of C within a sheath increases, spatter quantity increases during welding. When the amount exceeds about 0.015 wt %, spatter quantity becomes undesirably large during welding. Therefore, the amount of C within the sheath can be limited to less than about 0.015 wt % on the basis of the total weight of the metal sheath.

P+S+Co+B+Bi: about 0.10 wt % or Less

When an amount of P+S+Co+B+Bi within the sheath exceeds about 0.10 wt %, pitting corrosion resistance, cracking resistance, and strength can be degraded, and spatter quantity increases. Therefore, the amount of P+S+Co+B+Bi can be limited to less than about 0.10 wt % on the basis of the total weight of the sheath.

Hereinafter, reasons for limiting the amount of each element in a flux filled into the wire and the sheath will be described.

Cr: about 24.0-30.0 wt %

Cr is a ferrite-stabilizing element within weld metal and can improve pitting corrosion resistance, intragranular corrosion resistance, and cracking resistance. When the amount of Cr is less than about 24.0 wt %, these advantageous effects may not be sufficiently obtained. On the other hand, when an amount of Cr exceeds about 30.0 wt %, a 6 phase can be precipitated and brominated, thereby reducing toughness and elongation. Therefore, the amount of Cr can be set to a range of about 24.0 wt % to about 30.0 wt % with respect to the total weight of the wire. Metal-Cr, ferro-Cr(L/C), CrN or any other suitable material can be used for a Cr supply source (L/C means low carbon and hereinafter is used with the same meaning).

Ni: about 7.0-10.5 wt %

Ni is an austenite-stabilizing element within weld metal and can inhibit a ferrite phase from being formed in a welded metal portion. Ni can also enhance the toughness of weld metal as well as pitting corrosion resistance, intragranular corrosion resistance, and cracking resistance. When the amount of Ni is less than about 7.0 wt %, these effects may not be sufficiently obtained. On the other hand, when the amount exceeds about 10.5 wt %, the percentage of austenite can become undesirably large, leading to a reduction in strength and the effect of toughness enhancement can become insignificant. Therefore, the amount of Ni can be set to a range of about 7.0 wt % to about 10.5 wt % with respect to the total weight of the wire. A Ni supply source within the flux can be, for example, metal-Ni.

Mo: about 2.0-4.0 wt %

Mo can improve pitting corrosion resistance of weld metal and tempering resistance thereof at a high strength and a high temperature. When the amount of Mo is less than about 2.0 wt %, these effects may not be sufficiently obtained. When the amount of Mo exceeds about 4.0 wt %, a 6 phase can be precipitated and brominated such that toughness is reduced. Therefore, the amount of Mo can be set to a range of about 2.0 wt % to about 4.0 wt % with respect to the total weight of the wire. A Mo supply source within the flux can be, for example, metal-Mo or ferro-Mo (L/C).

Cu: about 0.10-2.50 wt %

Cu can enhance pitting corrosion resistance, specifically corrosion resistance to acid. Thus, in a low-pH environment, such as an environment where sulfuric acid ($H_2SO_4$) or hydrogen silicide is contained, Cu can enhance corrosion resistance. When the amount of Cu is less than about 0.1 wt %, the effect may not be sufficiently obtained. When the amount of Cu exceeds about 2.5 wt %, tensile strength and a yield point can each increase, leading to a reduction in ratios of toughness, elongation, and surface contraction. Therefore, the amount of Cu can be set to a range of about 0.1 wt % to about 2.5 wt % with respect to the total weight of the wire. A Cu supply source within the flux can be, for example, metal-Cu.

Si: about 0.40-1.00 wt %

Si can strengthen slag formation and weld metal. Si can be employed by ferrite to increase hardness, an elastic coefficient, and a tensile force and to decrease elongation and an impact value. When the amount of Si is less than about 0.40 wt %, a proper strength of weld metal may not be obtained. When the amount of Si exceeds about 1.00 wt %, a toughness reduction effect is larger than a strength increase effect. Therefore, an amount of Si can be set to a range of about 0.40 wt % to about 1.00 wt % with respect to the total weight of the wire. A Si supply source within the flux can be, for example, Fe—Si—Mn(L/C), metal-Si, or ferro-Si.

Mn: about 1.5-3.0 wt %

Mn is a deoxidization element and austenite-stabilizing element and can help adjust a minute structure of weld metal. When the amount of Mn is less than about 1.5 wt %, the effect may not be sufficiently obtained. When the amount of Mn exceeds about 3.0 wt %, good pitting corrosion resistance and strength may not be obtained. Therefore, the amount of Mn can be set to a range of about 1.5 wt % to about 3.0 wt % with respect to the total weight of the wire. A Mn supply source within flux can be, for example, metal-Mn, ferro-Mn (L/C), or Fe—Si—Mn (L/C).

N Compound (Converted Value of N): about 0.10-0.30 Wt %

N is a solid solution strengthening element and can increase the strength of weld metal and improve pitting corrosion resistance. When the amount of N is less than about 0.10%, the effect may not be sufficiently obtained. When the amount of N exceeds about 0.30%, welding defects such as a blowhole may occur, and toughness and an impact value can decrease. The amount of N exceeding 0.30% can also cause welding pores and aging hardening. Therefore, the amount of N can be set to a range of about 0.10 wt % to about 0.30 wt % with respect to the total weight of wire. An N compound supply source within the flux can be, for example, metal-MnN, ferro-MnN, or metal-CrN.

$TiO_2+SiO_2+ZrO_2+Al_2O_3$: about 6.5-12.0 wt %

$TiO_2$ can serve as a slag-forming agent to enhance arc stability. $TiO_2$ can also enhance a covering property of slag and make a bead shape favorable during welding. However, when the amount of $TiO_2$ is small, an undercut can occur, and it can be difficult to secure a sufficient amount of slag in weld metal. Therefore, a favorable bead shape can be hard to obtain. When the amount of $TiO_2$ is excessively large, the slag can become too fluid such that the covering property of slag is degraded, spatter quantity becomes large, and a welding defect such as slag inclusion can occur. A $TiO_2$ supply source within the flux can be, for example, rutile or ilminite.

$SiO_2$ can serve as an acidic flux to adjust the basicity of fused slag. $SiO_2$ can also adjust a viscosity and melting point of slag so as to improve a bead appearance and can enhance detachability of slag. When the amount of $SiO_2$ is small, viscosity may be so low that a skew bead or undercut can easily occur. Further, a bead width can become non-uniform, and a degree of bead spreading can be reduced so that a convex bead is formed. Therefore, the positive effect may not be sufficiently obtained. When the amount of $SiO_2$ is excessively large, slag viscosity can become extremely high so that a bead shape is degraded, and simultaneously, detachability of slag is degraded. A $SiO_2$ supply source within the flux can be, for example, silicate or feldspar.

$ZrO_2$ can, during vertical welding and overhead welding, maintain slag viscosity at a favorable state, inhibit slag from dropping, and improve a bead shape. When the amount of $ZrO_2$ is small, the effect may not be sufficiently obtained. When the amount of $ZrO_2$ is excessively large, slag viscosity can become extremely high so that a weld pool is excessively covered by the slag. Therefore, arc may not stabilized, and a welding defect such as slag inclusion can occur. A $ZrO_2$ supply source within the flux can be, for example, Zr sand or Zr oxide.

$Al_2O_3$ is an important component for adjusting viscosity and melting point of slag and is a neutral component for forming slag and adjusting basicity to improve welding performance. When the amount of $Al_2O_3$ is small, a viscosity and melting point of slag can become so low that a bead width and a bead grain can become non-uniform. Additionally, defects such as undercut can occur, and detachability of slag can be reduced. When the amount of $Al_2O_3$ is excessively large, a solidification temperature can increase so that a bead is degraded. Also, a viscosity can become so high that a convex bead is formed and slag inclusion occurs. Furthermore, an amount of oxygen can increase so that the toughness of deposited metal is degraded and the linearity of a bead end portion is reduced. An $Al_2O_3$ supply source within the flux can be, for example, alumina.

In embodiments of the present invention, when an amount of $TiO_2+SiO_2+ZrO_2+Al_2O_3$ is less than about 6.5 wt %, a small amount of slag is formed. Therefore, the covering property and detachability of slag is not excellent and arc stability decreases during welding, such that a favorable bead shape is hard to obtain. When an amount of $TiO_2+SiO_2+ZrO_2+Al_2O_3$ exceeds about 12.0 wt %, an excessive amount of slag is formed. Therefore, arc is unstable, spatter quantity becomes large, and a welding defect such as slag inclusion occurs. Therefore, the amount of $TiO_2+SiO_2+ZrO_2+Al_2O_3$ can be set to a range of about 6.5 wt % to about 12.0 wt % with respect to the total weight of wire.

$Li_2O+K_2O+Na_2O$: about 0.10-0.50 wt %

$Li_2O$, $K_2O$, and $Na_2O$ are important components for securing arc stability during high-speed welding and can reduce surface tension of slag so as to determine a bead appearance. $Li_2O$, $K_2O$, and $Na_2O$ can also adjust a slag viscosity. When the amount of $Li_2O+K_2O+Na_2O$ is less than about 0.10 wt %, an arc-stability effect can be significantly reduced, weld penetration can be reduced, and slag inclusion can occur. When the amount exceeds about 0.50 wt %, a convex bead can be formed so that welding performance is degraded and welding defects such as pit can occur. Therefore, the amount of $Li_2O+K_2O+Na_2O$ can be set to a range of about 0.10 wt % to about 0.50 wt % with respect to the total weight of wire.

A $Li_2O$ supply source within the flux can be, for example, lithium oxide. A $K_2O$ supply source can be, for example, feldspar, Zr sand, or Hausmannite. A $Na_2O$ supply source can be, for example, feldspar or cryolite.

Other Oxides: about 0.10-2.00 wt %

Other oxides can be added to supplement oxygen to weld metal and to adjust a slag amount. When the amount of the other oxides is less than about 0.10 wt %, the effect may not be obtained. When the amount of the other oxides exceeds about 2.00 wt %, a covering property of slag can be degraded, and spatter quantity can increase. Therefore, the amount of the other oxides within the flux can be set to a range of about 0.10 wt % to about 2.00 wt % with respect to the total weight of wire. An other oxide supply source can be, for example, $FeCO_3$, MnO, MgO, $Bi_2O_3$, or any combination thereof.

Metal Fluoride (Converted Value of F): about 0.10-0.50 wt %

Metal fluoride can enhance pit resistance, adjust a melting point of slag, and enhance a covering property and detachability of slag. When the amount of metal fluoride (as a converted value of F) is less than about 0.10 wt %, a pit can occurs or a covering property and detachability of slag can be degraded. When the amount of metal fluoride exceeds about 0.50 wt %, the melting point of slag can be significantly reduced, and a covering property of slag can be degraded. Also, a large amount of fume, caused by the generation of fluoride gas, can be generated. Therefore, the amount of metal fluoride (converted value of F) within the flux can be set to a range of about 0.10 wt % to about 0.50 wt % with respect to the total weight of wire. Metal fluorides used can include, for example, LiF, $MgF_2$, $AlF_3$, or $CaF_2$.

Hereinafter, reasons for limiting the amount of flux filled into the sheath of the flux cored wire for duplex stainless steel according to embodiments of the present invention will be described.

When the amount of flux filled into the sheath is less than about 26 wt %, it can be difficult to sufficiently secure an amount of slag which should cover an outer surface of bead while satisfactorily composing chemical components of weld metal. When the amount of flux exceeds about 35 wt %, cutting of the wire can occur during manufacturing and an excessively large amount of slag can be formed, which can make it difficult to obtain favorable welding performance. Therefore, the amount of flux filled into the sheath can be set to a range of about 26 wt % to about 35 wt % with respect to the total weight of the wire.

Hereinafter, reasons for limiting the total amount of oxygen supplied by oxides (wt %, hereinafter represented by Po) within the flux filled into the sheath of flux cored wire for duplex stainless steel according to embodiments of the present invention will be described in detail.

As the total amount (wt %) Po of oxygen supplied by oxides within the flux filled into the sheath, which is expressed by Equation 1, is controlled, it is possible to further enhance mechanical performance of weld metal and welding performance.

$$Po = \sum_{i=1}^{n} (Xi \times \delta i) \qquad (1)$$

Here, Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (wt %) of oxides within the flux filled into the sheath on the basis of the total weight of the wire, and $\delta i$ represents a percentage of oxygen atoms included in an oxide i within the flux.

In general, as the amount of oxygen in weld metal increases, mechanical performance tends to reduce. When the amount of oxygen within weld metal excessively increases, some oxygen can be deoxidized by alloy elements, including alkali elements having a strong deoxidizing force, so as to be discharged with slag. However, some oxides, which are not discharged, can stay in weld metal. Simultaneously, the oxides can weaken a bonding force between metals at a portion adjacent thereto such that minute pores are easily generated, thereby degrading mechanical performance of weld metal. On the other hand, it is generally known that a certain amount of oxygen should be present in weld metal, in order to enhance welding performance. Therefore, to understand such characteristics opposed to each other, the present inventor has carried out research on the amount of oxygen which can enhance welding performance without reducing mechanical performance of a weld zone. As a result, the inventor has found that a factor capable of injecting oxygen into weld metal is a flux. Furthermore, while checking an amount of oxygen injected from flux, or specifically oxides with respect to the total weight percentage (wt %), the present inventor has evaluated mechanical performance of weld metal and welding performance at the same time. Additionally, the present inventor has found that, when Po is regulated in the range of about 3.0 wt % to about 5.2 wt %, there is an effect in terms of mechanical performance of weld metal and welding performance. When Po is less than about 3.0 wt %, welding performance is degraded. When Po exceeds about 5.2 wt %, a welding defect is caused by an increase in amount of oxygen within weld metal such that mechanical performance of weld metal is significantly reduced.

The contents of the sheath, the flux filled into the sheath, and the flux cored wire for duplex stainless steel including the sheath and the flux have been analyzed using an ICP-AES (Inductively Coupled Plasma Atomic Emission Spectrometer), XRF (X-ray Fluorescence Spectrometry) and other suitable methods known in the art.

Hereinafter, a method of manufacturing the flux cored wire for duplex stainless steel according to an embodiment of the present invention will be described.

The flux cored wire for duplex stainless steel according to an embodiment of the present invention can be manufactured by a process including: forming the sheath in a U shape; filling a mixed flux into the sheath formed in a U shape so as to form a seamed portion in a tube shape; performing primary drawing; performing heat treatment; and performing secondary drawing up to an actual diameter. However, the present invention is not limited to the manufacturing process.

Hereinafter, reasons why the apparent density (g/L) and particle size distribution of the filled flux in flux cored wire for duplex stainless steel according to embodiments of the present invention are limited in order to increase productivity and manufacturing performance of products will be described in detail.

Through testing, it has been found by the present inventor that the apparent density of a flux is a very important factor in the filling of the flux into the sheath and/or the drawing in the method of manufacturing flux cored wire. The apparent densities of fluxes filled into the sheath can be adjusted in various manners by measuring the apparent density of each flux and the apparatus density of a mixed flux at the same time. The measuring method will be described below in detail. The apparent density represents the weight of a mixed flux per IL of mixed flux. Additionally, while the particle sizes of the mixed flux can be controlled using a standard sieve by classifying the particle sizes into ultra fine particle sizes (50-mesh, 60-mesh, 100-mesh, 140-mesh, 200-mesh, 230-mesh, and 270-mesh), various tests have been carried out.

When fluxes having a relatively low apparent density are filled into the sheath, that is, when the apparent density is less than about 3.50 g/L, the flux can overflow to the outside of the sheath, because the volume of a mixed flux is large. When the filling is performed, some fluxes having a small particle size and a low apparent density can be dispersed to the outside of the sheath, which can make it difficult to make a uniform wire. Accordingly, mechanical performance of weld metal is degraded. On the other hand, when a large quantity of flux having a high apparent density is filled, that is, when the apparent density exceeds about 4.50 g/L, a degree of work hardening can increase during drawing, and cutting of a wire can occur in some cases. Then, manufacturing performance of products can be reduced, and a covering property of slag can be degraded during welding. Therefore, when the apparent density of the flux filled into the sheath is in a range of about 3.5 g/L to about 4.5 g/L, drawability and manufacturing performance of products can be optimized.

When a ratio (hereinafter, represented by P1) of particles of the mixed flux which all pass through a 60-mesh standard sieve and do not pass through a 230-mesh standard sieve ranges from about 65% to about 85% of the overall mixed flux, and the other particles all pass through the 230-mesh standard sieve, drawability and a welding characteristic of a weld zone is enhanced to thereby enhance productivity. Additionally, more uniform products can be manufactured at a relatively low cost. When P1 is less than about 65%, it is difficult to obtain drawability or enhancement of manufacturing performance during manufacturing, and mechanical performance of weld metal is degraded. When P1 exceeds about 85%, drawability is degraded. Furthermore, when P1 deviates from the prescribed range, and the ratio of particles of the mixed flux which do not pass through a 60-mesh standard sieve is large, cutting of wire can occur during manufacturing. Therefore, manufacturing performance can be significantly degraded. When P1 deviates from the prescribed range, and a ratio of particles which pass through a 230-mesh standard sieve is large, it can be difficult to secure a uniform filling rate when a flux is filled into a sheath when a product is manufactured. Also, during filling, the flux can be dispersed to the outside of the sheath such that mechanical performance of weld metal is degraded.

EXAMPLES

Hereinafter, the effect of embodiments of the flux cored wire for duplex stainless steel will be described by comparing and Example of an embodiment of the present invention with Comparative examples.

TABLE 1

Chemical Components of Weld Base Metal
Chemical components of weld base metal (%)

| C | Si | Mn | P | S | Cu | Ni | Cr | Mo | N | The others |
|---|----|----|---|---|----|----|----|----|---|------------|
| 0.024 | 0.34 | 1.78 | 0.02 | 0.006 | 0.15 | 5.7 | 22.5 | 3 | 0.12 | Fe and impurities |

TABLE 2

Welding Conditions
Welding conditions

| | Welding position | | |
|---|---|---|---|
| | Welding in flat position | Vertical welding | Overhead welding |
| Current (A) | 190-210 | 180 | 190 |
| Voltage (V) | 27-29 | 26 | 27 |
| Welding speed (cm/min) | 25-30 | 7 | 27 |
| Welding heat input (kJ/cm) | 10.3-14.6 | 40.1 | 11.4 |
| Wire diameter (mm) | 1.2 | 1.2 | 1.2 |
| Polarity | DCEP | DCEP | DCEP |
| Shielding gas | 100% $CO_2$ | 100% $CO_2$ | 100% $CO_2$ |

TABLE 3

| | | Welding Conditions | | | |
|---|---|---|---|---|---|
| | | Length of | Shielding gas | | |
| Current (A) | Voltage (V) | projected wire (mm) | Type | Flow rate (l/min) | Speed (CPM) |
| 200 | 30 | 20 | 100% $CO_2$ | 20 | 30 |

Table 1 shows the chemical composition of weld base metal for evaluating the flux cored wire for duplex stainless steel according to an embodiment of the present invention. Welding performance is evaluated on the basis of welding conditions for each welding position shown in Table 2, and cracking resistance is evaluated by a method shown in FIG. 2 under welding conditions shown in FIG. 3. Tables 6 and 7 show the evaluation results. Additionally, the flux cored wire for duplex stainless is manufactured by using a sheath formed of a steel material and a flux shown in Tables 4 and 5.

Figure 1B:
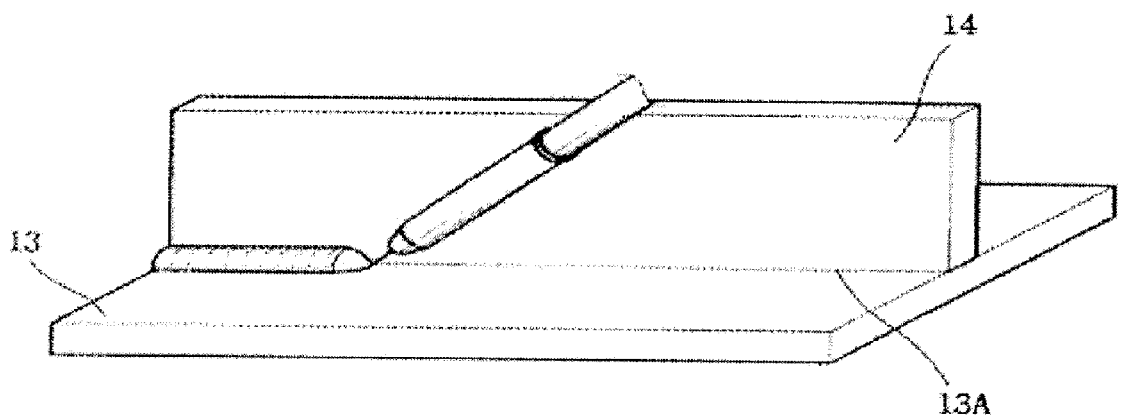
FIG. 1B is a schematic view showing welding in an H-fillet position.
Figure 1C:
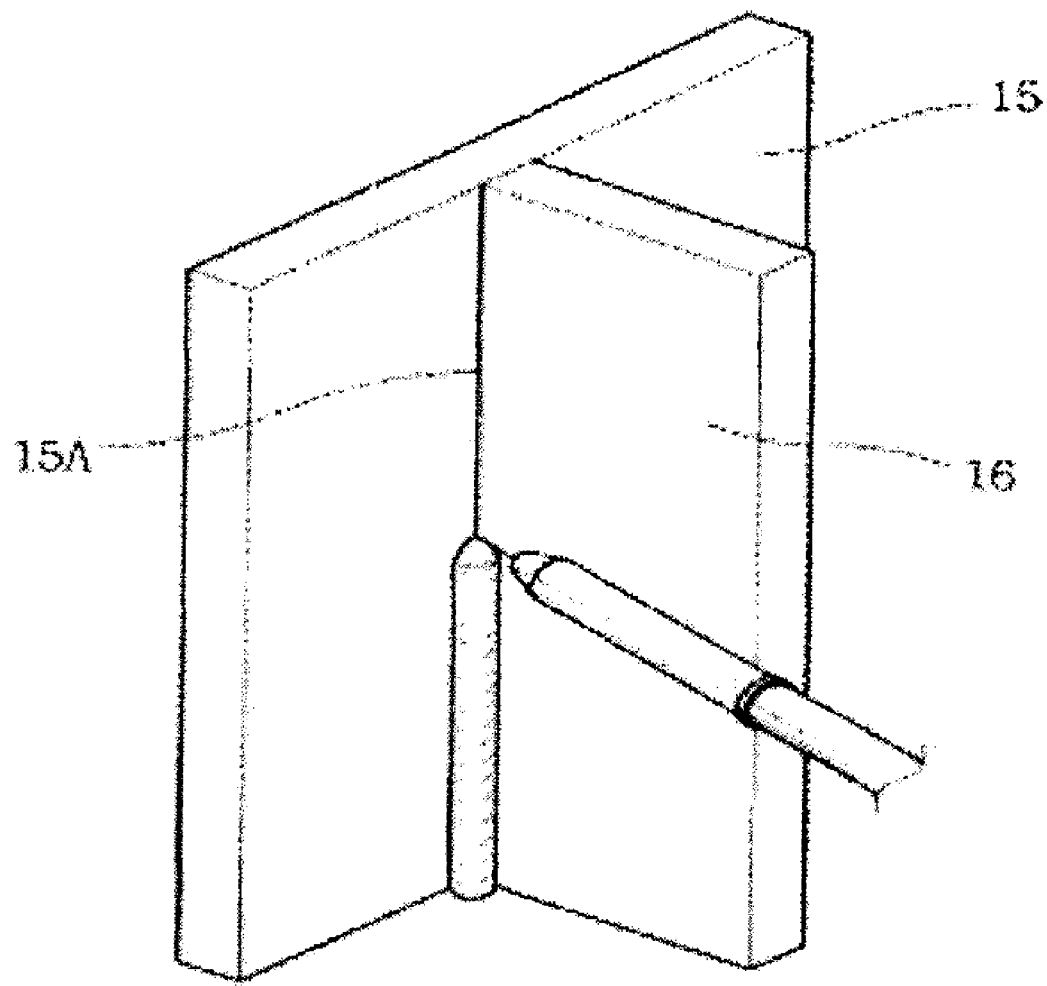
FIG. 1C is a schematic view showing overhead welding.

Next, the welding positions for the evaluation of welding performance and a method of manufacturing base metal will be described in detail. In the welding in a flat position, a root gap d can be formed between two base metals 11 and 12, and weld metal W can then be formed between two weld groove surfaces 11A and 12A, as shown in FIG. 1A. In welding both in a flat position and in an H-fillet position, a weld member 14 can be set tip vertically on the top surface of flat base metal 13 placed on a floor, and welding can then be performed along a contact line 13A, as shown in FIG. 1B. In the overhead welding, a weld member 16 can be vertically contacted to one side surface of flat base metal 15 which is set up vertically with respect to the ground, and welding can then be performed upward along a contact line 15A, as shown in FIG. 1C.

A method of measuring apparent densities (g/L) of fluxes filled into the sheath can be performed as follows.

1. Measure the weight of a 1 liter beaker (where the weight is referred to as W1).

2. Fill a mixed flux into the 1 liter beaker, shake in a shaker for about one minute, and then measure the weight (where the weight is referred to as W2).

3. Calculate the weight of only the pure mixed flux through "W2−W1", and represent the weight by mixed-flux weight (grams) per 1 liter.

A method of measuring particle sizes of the mixed flux can be performed as follows.

1. Put standard sieves in order from 50 mesh to 270 mesh from above to below.

2. Accurately measure 100 g of mixed flux to carry into the 50-mesh standard sieve, put a lid on the sieve, and then shake in a shaker for about 15 minutes.

3. After shaking, brush and collect particles which have not passed through the 50-mesh standard sieve, measure the particles, and calculate the weight percentage (wt %) of the particles for each standard sieve.

TABLE 4

| | | Wire Components | | | | | | | | | |
|---|---|---|---|---|---|---|---|---|---|---|---|
| | | Chemical components of sheath (wt %) | | Components of wire (wt %) | | | | | | | |
| Division | | C | P + S + Co + B + Bi | Remainder | Cr | Ni | Mo | Cu | Si | Mn | N compound (converted value of N) | Remainder |
| Examples of Invention | 1 | 0.013 | 0.09 | Bal. | 25.2 | 9.2 | 3.4 | 2.30 | 0.84 | 1.5 | 0.14 | Bal. |
| | 2 | 0.013 | 0.09 | Bal. | 25.4 | 9.7 | 3.1 | 1.50 | 0.86 | 2.0 | 0.16 | Bal. |
| | 3 | 0.014 | 0.08 | Bal. | 26.5 | 10.0 | 2.8 | 1.90 | 0.72 | 2.3 | 0.22 | Bal. |
| | 4 | 0.014 | 0.09 | Bal. | 24.6 | 10.3 | 3.4 | 0.10 | 0.68 | 2.1 | 0.10 | Bal. |
| | 5 | 0.013 | 0.09 | Bal. | 24.0 | 8.6 | 4.0 | 1.65 | 0.58 | 2.7 | 0.13 | Bal. |
| | 6 | 0.012 | 0.08 | Bal. | 26.0 | 10.2 | 3.3 | 0.40 | 0.91 | 2.2 | 0.22 | Bal. |
| | 7 | 0.014 | 0.10 | Bal. | 27.8 | 10.3 | 2.0 | 2.10 | 0.49 | 2.6 | 0.26 | Bal. |
| | 8 | 0.014 | 0.08 | Bal. | 24.6 | 8.2 | 3.7 | 2.35 | 0.64 | 2.8 | 0.13 | Bal. |
| | 9 | 0.010 | 0.08 | Bal. | 24.5 | 7.0 | 2.4 | 2.00 | 1.00 | 2.4 | 0.21 | Bal. |
| | 10 | 0.013 | 0.08 | Bal. | 25.5 | 9.1 | 3.2 | 2.00 | 0.59 | 2.2 | 0.15 | Bal. |
| | 11 | 0.014 | 0.09 | Bal. | 25.3 | 8.9 | 3.3 | 1.98 | 0.61 | 2.5 | 0.15 | Bal. |
| | 12 | 0.015 | 0.09 | Bal. | 30.0 | 10.3 | 2.5 | 2.40 | 0.40 | 2.6 | 0.30 | Bal. |
| | 13 | 0.015 | 0.09 | Bal. | 26.8 | 9.4 | 3.0 | 1.75 | 0.47 | 2.4 | 0.20 | Bal. |
| | 14 | 0.013 | 0.08 | Bal. | 25.5 | 10.5 | 2.8 | 1.86 | 0.82 | 1.8 | 0.14 | Bal. |
| | 15 | 0.013 | 0.08 | Bal. | 28.6 | 9.9 | 3.0 | 2.50 | 0.73 | 3.0 | 0.28 | Bal. |
| Comparative examples | 16 | 0.011 | 0.08 | Bal. | 25.5 | 9.0 | 3.3 | 0.09 | 0.39 | 2.3 | 0.13 | Bal. |
| | 17 | 0.013 | 0.09 | Bal. | 23.9 | 8.6 | 3.2 | 1.65 | 0.52 | 1.4 | 0.13 | Bal. |
| | 18 | 0.013 | 0.09 | Bal. | 27.5 | 6.9 | 3.0 | 1.91 | 0.88 | 2.2 | 0.24 | Bal. |
| | 19 | 0.012 | 0.10 | Bal. | 25.2 | 9.8 | 3.1 | 0.12 | 0.92 | 1.6 | 0.09 | Bal. |
| | 20 | 0.014 | 0.11 | Bal. | 25.5 | 8.7 | 3.4 | 2.00 | 0.59 | 2.3 | 0.13 | Bal. |
| | 21 | 0.022 | 0.08 | Bal. | 25.1 | 9.4 | 3.9 | 1.40 | 1.54 | 2.9 | 0.16 | Bal. |
| | 22 | 0.014 | 0.10 | Bal. | 24.8 | 9.6 | 3.5 | 1.00 | 0.49 | 1.8 | 0.20 | Bal. |
| | 23 | 0.010 | 0.08 | Bal. | 26.0 | 9.8 | 2.4 | 1.99 | 1.01 | 2.7 | 0.24 | Bal. |
| | 24 | 0.016 | 0.08 | Bal. | 25.2 | 10.6 | 3.3 | 1.97 | 1.00 | 2.2 | 0.18 | Bal. |
| | 25 | 0.011 | 0.08 | Bal. | 25.0 | 8.7 | 3.4 | 2.52 | 0.78 | 2.4 | 0.14 | Bal. |
| | 26 | 0.012 | 0.15 | Bal. | 25.0 | 9.2 | 3.3 | 1.66 | 0.53 | 2.6 | 0.13 | Bal. |
| | 27 | 0.013 | 0.09 | Bal. | 28.7 | 10.1 | 1.9 | 2.50 | 0.41 | 2.5 | 0.24 | Bal. |
| | 28 | 0.012 | 0.09 | Bal. | 26.0 | 9.8 | 3.0 | 1.55 | 0.69 | 1.9 | 0.31 | Bal. |
| | 29 | 0.015 | 0.08 | Bal. | 24.0 | 10.7 | 4.1 | 1.68 | 0.77 | 2.1 | 0.18 | Bal. |
| | 30 | 0.013 | 0.08 | Bal. | 30.1 | 10.3 | 2.0 | 2.40 | 0.63 | 3.1 | 0.16 | Bal. |

TABLE 5

| | | | | | | Flux components (wt %) | | | | |
|---|---|---|---|---|---|---|---|---|---|---|
| Division | | $TiO_2$ | $SiO_2$ | $ZrO_2$ | $Al_2O_3$ | $TiO_2 + SiO_2 + ZrO_2 + Al_2O_3$ | $Li_2O$ | $K_2O$ | $Na_2O$ | $Li_2O + K_2O + Na_2O$ |
| Examples of Invention | 1 | 8.30 | 1.00 | 1.30 | 0.20 | 10.80 | 0.10 | 0.20 | 0.10 | 0.40 |
| | 2 | 8.70 | 0.90 | 0.90 | 0.70 | 11.20 | 0.25 | 0.15 | 0.10 | 0.50 |
| | 3 | 7.70 | 0.70 | 0.70 | 0.60 | 9.70 | — | 0.06 | 0.04 | 0.10 |
| | 4 | 9.40 | 1.40 | 0.95 | 0.25 | 12.00 | — | 0.20 | 0.10 | 0.30 |
| | 5 | 7.80 | 1.10 | 0.60 | 0.24 | 9.74 | — | — | 0.20 | 0.20 |
| | 6 | 8.10 | 0.70 | 0.70 | 0.15 | 9.65 | — | 0.30 | 0.04 | 0.34 |
| | 7 | 3.20 | 2.50 | 1.20 | 1.00 | 7.90 | — | 0.28 | 0.08 | 0.36 |
| | 8 | 4.00 | 1.40 | 1.70 | 0.30 | 7.40 | — | 0.20 | 0.10 | 0.30 |
| | 9 | 3.00 | 1.60 | 2.10 | 0.70 | 7.40 | — | 0.23 | 0.07 | 0.30 |
| | 10 | 2.80 | 1.40 | 2.10 | 0.70 | 7.00 | — | 0.23 | 0.08 | 0.31 |
| | 11 | 4.00 | 1.40 | 2.10 | 0.80 | 8.30 | — | 0.20 | 0.07 | 0.27 |
| | 12 | 3.20 | 2.50 | 1.40 | 0.40 | 7.50 | — | 0.26 | 0.07 | 0.33 |
| | 13 | 6.00 | 2.00 | 0.10 | 0.60 | 8.70 | 0.08 | 0.18 | 0.07 | 0.33 |
| | 14 | 6.00 | 2.10 | 0.10 | 0.60 | 8.80 | 0.07 | 0.20 | 0.07 | 0.34 |
| | 15 | 2.50 | 2.50 | 1.00 | 0.50 | 6.50 | — | 0.28 | 0.08 | 0.36 |
| Comparative examples | 16 | 7.30 | 0.60 | 0.90 | 0.30 | 9.10 | 0.10 | 0.20 | 0.10 | 0.40 |
| | 17 | 7.50 | 0.60 | 0.10 | 0.20 | 8.40 | 0.12 | 0.20 | 0.06 | 0.38 |
| | 18 | 6.10 | 0.30 | 0.60 | 0.20 | 7.20 | 0.35 | 0.10 | 0.10 | 0.52 |
| | 19 | 9.40 | 0.90 | 1.00 | 0.80 | 12.10 | 0.15 | 0.13 | 0.10 | 0.38 |
| | 20 | 5.80 | 0.70 | 1.60 | 0.20 | 8.30 | 0.18 | 0.22 | — | 0.40 |
| | 21 | 5.60 | 0.60 | 2.00 | 0.30 | 8.50 | 0.10 | 0.24 | 0.12 | 0.46 |
| | 22 | 9.60 | 1.60 | 2.40 | 0.60 | 14.20 | — | 0.06 | 0.24 | 0.30 |
| | 23 | 7.80 | 1.30 | 0.60 | 0.20 | 9.90 | 0.10 | 0.20 | 0.10 | 0.40 |
| | 24 | 6.00 | 1.20 | 1.30 | 0.30 | 8.80 | 0.10 | 0.20 | 0.18 | 0.48 |
| | 25 | 5.60 | 1.00 | 0.80 | 0.30 | 7.70 | 0.05 | 0.04 | — | 0.09 |
| | 26 | 7.10 | 0.50 | 0.90 | 0.10 | 8.60 | 0.10 | 0.24 | 0.10 | 0.44 |
| | 27 | 4.50 | 1.20 | 0.40 | 0.30 | 6.40 | 0.80 | 0.60 | 0.20 | 1.60 |
| | 28 | 6.00 | 0.60 | 1.40 | 0.20 | 8.20 | 0.14 | 0.18 | 0.08 | 0.40 |
| | 29 | 5.80 | 0.60 | 1.40 | 0.60 | 8.40 | 0.20 | 0.10 | 0.08 | 0.38 |
| | 30 | 4.00 | 0.80 | 1.10 | 0.70 | 6.60 | 0.20 | 0.23 | 0.07 | 0.50 |

| | | Flux components (wt %) | | | | | Design flux | | |
|---|---|---|---|---|---|---|---|---|---|
| | | | Metal | | | | | | |
| Division | | The other oxides | fluoride (converted value of F) | Remainder | Filling rate (%) | Po | Apparent density (g/l) | P1 | |
| Examples of Invention | 1 | 0.80 | 0.32 | Bal. | 28.2 | 4.73 | 3.62 | 73 | |
| | 2 | 1.00 | 0.34 | Bal. | 27.4 | 5.00 | 3.77 | 75 | |
| | 3 | 1.00 | 0.27 | Bal. | 28.8 | 4.23 | 3.93 | 79 | |
| | 4 | 2.00 | 0.50 | Bal. | 26.0 | 5.20 | 3.50 | 65 | |
| | 5 | 0.90 | 0.26. | Bal. | 26.4 | 4.54 | 3.61 | 72 | |
| | 6 | 0.80 | 0.18 | Bal. | 27.0 | 4.53 | 3.84 | 76 | |
| | 7 | 0.80 | 0.10 | Bal. | 30.0 | 4.18 | 4.20 | 81 | |
| | 8 | 0.80 | 0.22 | Bal. | 26.0 | 3.53 | 3.56 | 69 | |
| | 9 | 1.10 | 0.46 | Bal. | 26.5 | 3.24 | 3.52 | 66 | |
| | 10 | 1.00 | 0.37 | Bal. | 28.4 | 3.00 | 3.82 | 76 | |
| | 11 | 0.90 | 0.17 | Bal. | 28.4 | 3.57 | 3.60 | 70 | |
| | 12 | 1.10 | 0.12 | Bal. | 34.5 | 3.85 | 4.00 | 79 | |
| | 13 | 1.60 | 0.25 | Bal. | 28.6 | 4.18 | 3.90 | 79 | |
| | 14 | 1.00 | 0.49 | Bal. | 26.5 | 4.33 | 3.54 | 68 | |
| | 15 | 0.10 | 0.11 | Bal. | 35.0 | 3.77 | 4.50 | 85 | |
| Comparative examples | 16 | 1.10 | 0.34 | Bal. | 27.0 | 4.06 | 3.68 | 60 | |
| | 17 | 2.10 | 0.32 | Bal. | 23.8 | 3.84 | 3.56 | 64 | |
| | 18 | 1.00 | 0.50 | Bal. | 25.9 | 3.83 | 3.83 | 81 | |
| | 19 | 1.00 | 1.50 | Bal. | 28.4 | 5.21 | 3.78 | 78 | |
| | 20 | 1.00 | 0.42 | Bal. | 27.3 | 2.99 | 3.73 | 77 | |
| | 21 | 0.80 | 0.34 | Bal. | 28.4 | 3.58 | 3.49 | 77 | |
| | 22 | 0.70 | 0.51 | Bal. | 32.0 | 5.89 | 4.00 | 82 | |
| | 23 | 0.80 | 0.09 | Bal. | 30.2 | 4.42 | 3.92 | 80 | |
| | 24 | 0.90 | 0.39 | Bal. | 28.6 | 3.92 | 3.72 | 77 | |
| | 25 | 1.80 | 0.36 | Bal. | 28.6 | 3.83 | 3.81 | 78 | |
| | 26 | 1.20 | 0.38 | Bal. | 36.0 | 4.11 | 3.70 | 77 | |
| | 27 | 1.50 | 0.34 | Bal. | 26.6 | 3.21 | 3.70 | 86 | |
| | 28 | 2.80 | 0.48 | Bal. | 27.5 | 4.18 | 3.72 | 75 | |
| | 29 | 0.09 | 0.49 | Bal. | 27.5 | 3.98 | 3.72 | 76 | |
| | 30 | 0.90 | 0.23 | Bal. | 33.6 | 3.06 | 4.51 | 87 | |

Here, P1 represents a ratio of particles of a mixed flux which all pass through a 60-mesh standard sieve and do not pass through a 230-mesh standard sieve to the overall mixed flux.

Figure 2:
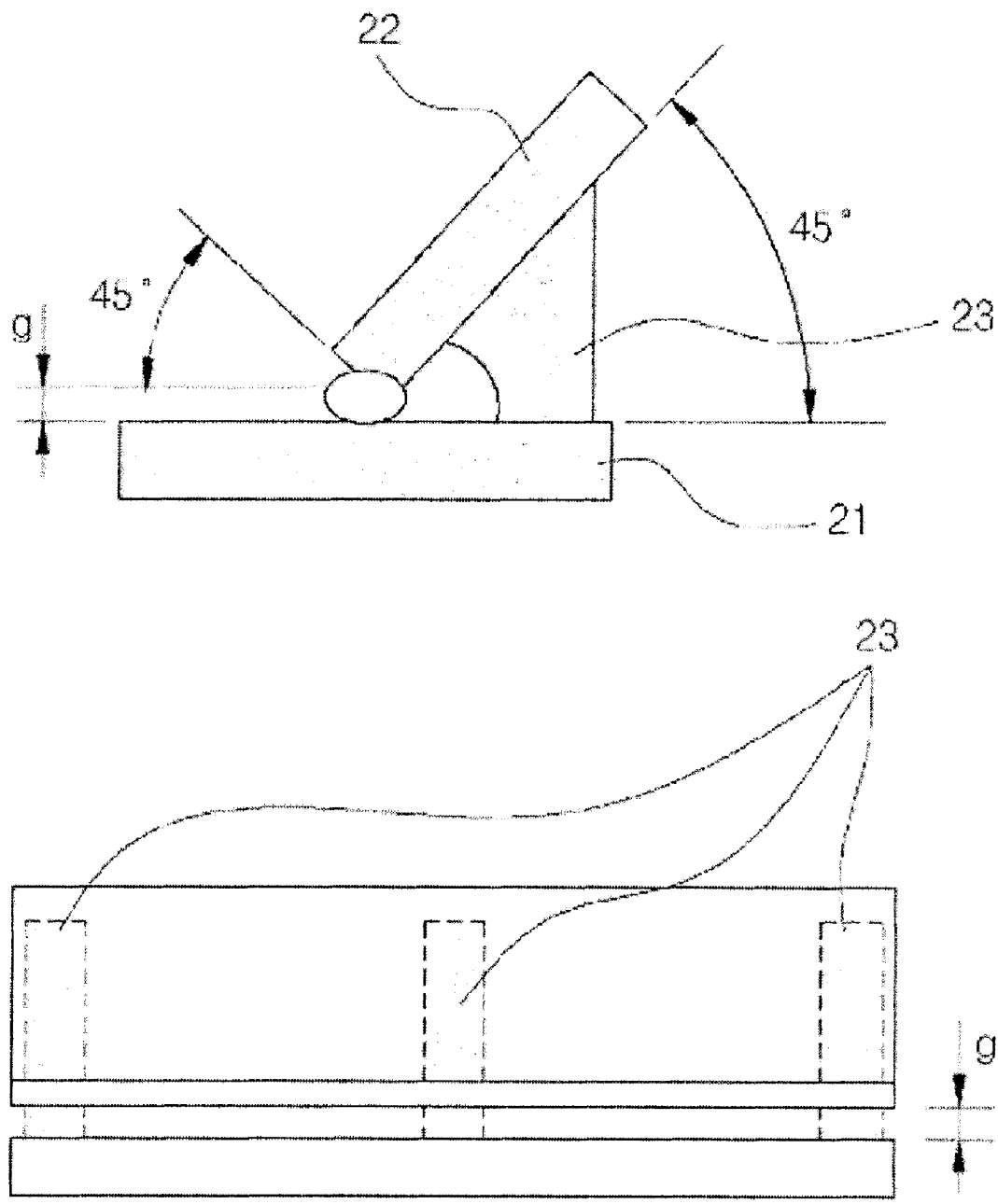
FIG. 2 is a schematic view showing a method of evaluating cracking resistance.

Tables 6 and 7 show results of evaluating welding performance on the respective flux cored wires for duplex stainless steel, after welding is performed by the above-described welding methods. The evaluation results are represented by Excellent (⊚), Normal (○), and Defective (x). The evaluation of cracking resistance can be performed in a state where a weld member is set up at an inclined angle of about 45° on the top surface of flat base metal placed on a floor such that the flat base metal and the weld member form an angle of about 45°, as shown in FIG. 2. At this time, the flat base metal and the weld member can be strongly bound to each other, and a root gap can be formed in a lower portion such that one-pass welding can be performed in a longitudinal direction under the welding conditions shown in Table 3. Then, when the weld zone is sufficiently cooled, a penetration test (PT), which is a nondestructive test, can be performed. The evaluation results are shown in Tables 6 and 7. Furthermore, as an evaluation criterion, when it is found through the PT that cracks do not occur in the weld zone, the result is represented by 'Favorable'. When it is found that cracks occur in the welded portion, the result is represented by 'Poor'. Also, a tensile test can be based on JIS Z 3111. After a specimen is heat-treated at a temperature of about 200° C. for about one hour, the tensile test can be performed. When a tensile value is equal to or more than 760 MPa and elongation is equal to or more than 15%, the result is represented by 'Favorable'. When a tensile value is less than 760 MPa or when a tensile value is equal to or more than 760 MPa and elongation is less than 15%, the result is represented by 'Poor'. Corrosion mass loss is processed according to ASTM G48 Method-A. Then, a specimen is picked and a corrosion test is performed to evaluate the corrosion mass loss. When a corrosion mass loss is less than about 0.1 g/mm$^2$·h, the result is represented by 'Favorable'. When a corrosion mass loss is equal to or more than 0.1 g/mm$^2$·h, it is represented by 'Poor'.

As for an evaluation criterion on productivity, when cutting of a wire does not occur, the result is represented by 'Favorable'. When cutting of a wire occurs, the result is represented by 'Poor'.

TABLE 6

Welding Performance Results

| Division | No | Evaluation results on welding performance | | | | | Mechanical performance | | | |
|---|---|---|---|---|---|---|---|---|---|---|
| | | Arc stability | Spatter quantity | Detach-ability of slag | Covering property of slag | Bead appearance | Pitting corrosion proof | Cracking resistance | Strength performance | Productivity |
| Examples of Invention | 1 | ⊚ | ⊚ | ⊚ | ⊚ | ⊚ | Favorable | Favorable | Favorable | Favorable |
| | 2 | ⊚ | ⊚ | ⊚ | ⊚ | ⊚ | Favorable | Favorable | Favorable | Favorable |
| | 3 | ⊚ | ○ | ○ | ⊚ | ⊚ | Favorable | Favorable | Favorable | Favorable |
| | 4 | ○ | ⊚ | ○ | ⊚ | ⊚ | Favorable | Favorable | Favorable | Favorable |
| | 5 | ⊚ | ⊚ | ⊚ | ○ | ○ | Favorable | Favorable | Favorable | Favorable |
| | 6 | ⊚ | ⊚ | ⊚ | ⊚ | ⊚ | Favorable | Favorable | Favorable | Favorable |
| | 7 | ⊚ | ○ | ⊚ | ⊚ | ⊚ | Favorable | Favorable | Favorable | Favorable |
| | 8 | ⊚ | ⊚ | ⊚ | ⊚ | ⊚ | Favorable | Favorable | Favorable | Favorable |
| | 9 | ○ | ⊚ | ○ | ⊚ | ⊚ | Favorable | Favorable | Favorable | Favorable |
| | 10 | ⊚ | ⊚ | ⊚ | ⊚ | ⊚ | Favorable | Favorable | Favorable | Favorable |
| | 11 | ⊚ | ⊚ | ⊚ | ⊚ | ⊚ | Favorable | Favorable | Favorable | Favorable |
| | 12 | ○ | ○ | ○ | ⊚ | ○ | Favorable | Favorable | Favorable | Favorable |
| | 13 | ⊚ | ⊚ | ⊚ | ⊚ | ⊚ | Favorable | Favorable | Favorable | Favorable |
| | 14 | ○ | ○ | ⊚ | ⊚ | ⊚ | Favorable | Favorable | Favorable | Favorable |
| | 15 | ○ | ⊚ | ⊚ | ○ | ○ | Favorable | Favorable | Favorable | Favorable |

TABLE 7

Welding Performance Results

| Division | No | Evaluation results on welding performance | | | | | Mechanical performance | | | |
|---|---|---|---|---|---|---|---|---|---|---|
| | | Arc stability | Spatter quantity | Detach-ability of slag | Covering property of slag | Bead appearance | Pitting corrosion proof | Cracking resistance | Strength performance | Productivity |
| Comparative Examples | 16 | ○ | ○ | ○ | X | X | Poor | Poor | Poor | Poor |
| | 17 | ○ | ○ | ○ | X | X | Poor | Favorable | Poor | Poor |
| | 18 | ○ | ○ | X | X | X | Poor | Poor | Favorable | Poor |
| | 19 | X | X | ○ | ○ | X | Poor | Poor | Poor | Favorable |
| | 20 | ○ | X | X | X | ○ | Poor | Poor | Poor | Favorable |
| | 21 | ○ | X | ○ | ⊚ | ○ | Favorable | Poor | Favorable | Poor |
| | 22 | X | X | X | ○ | X | Favorable | Poor | Poor | Favorable |
| | 23 | ○ | ○ | X | X | X | Favorable | Poor | Favorable | Favorable |
| | 24 | ⊚ | X | ○ | ○ | ○ | Poor | Poor | Poor | Favorable |
| | 25 | X | ○ | ○ | X | X | Favorable | Poor | Favorable | Favorable |
| | 26 | ○ | X | ○ | ○ | ○ | Poor | Poor | Poor | Poor |
| | 27 | X | X | X | X | ○ | Favorable | Poor | Poor | Poor |

TABLE 7-continued

Welding Performance Results

| Division | No | Evaluation results on welding performance | | | | | Mechanical performance | | | Productivity |
| | | Arc stability | Spatter quantity | Detachability of slag | Covering property of slag | Bead appearance | Pitting corrosion proof | Cracking resistance | Strength performance | |
| --- | --- | --- | --- | --- | --- | --- | --- | --- | --- | --- |
| | 28 | ○ | X | ○ | X | X | Favorable | Poor | Poor | Favorable |
| | 29 | ○ | ○ | X | X | ○ | Favorable | Poor | Poor | Favorable |
| | 30 | X | X | ○ | ○ | X | Favorable | Poor | Favorable | Poor |

As shown in Table 6, the wires according to Examples 1 to 15 of embodiments of the present invention have exhibited favorable results. In particular, the wires according to Examples 1, 2, and 6 or Examples 8, 10, 11, and 13 have exhibited extremely excellent results in terms of welding performance, and the wires according to Examples 1, 2, and 6 or Examples 10, 11, and 13 have exhibited extremely excellent results in terms of pitting corrosion resistance, cracking resistance, strength performance, and drawability.

In Comparative example 16, the amounts of Cu and Si are so small that a corrosion mass loss is relatively large. Also, the strength performance is degraded, and slag fluidity is reduced so that the covering property of slag and the bead appearance are poor. In addition, since P1 is extremely small, the particle-size distribution of the mixed flux is not uniform, which makes it difficult to make a uniform wire. Additionally, the mechanical performance of weld metal is degraded.

In Comparative example 17, the amounts of Cr and Mn are extremely small, and the filling rate is extremely low. The particle-size distribution of the flux deviates from the prescribed range of embodiments of the present invention such that the pitting corrosion resistance and the productivity are degraded. An amount of the other oxides filled in the wire is so large that the covering property and the bead appearance are poor.

In Comparative example 18, the amount of $Li_2+K_2O+Na_2O$ exceeds the prescribed range of embodiments of the present invention. Also, the amount of Ni is small, and the filling rate is low so that the cracking resistance and the pitting corrosion resistance are degraded. Furthermore, the detachability of slag and the bead appearance are poor, and the drawability is degraded.

In Comparative example 19, the amount of N compound (converted value of N) is less than the prescribed range of embodiments of the present invention, and the amount of $TiO_2+SiO_2+ZrO_2+Al_2O_3$ and the amount of metal fluoride (converted value of F) also exceed the prescribed ranges. Po deviates from a prescribed value as well. Therefore, when welding performance is evaluated, arc stability is poor, spatter quantity is large, and a corrosion mass loss is so large that pitting corrosion resistance is degraded. Additionally, the cracking resistance and the strength performance are degraded.

In Comparative example 20, since the amount of P+S+Co+B+Bi within the sheath exceeds the prescribed range of embodiments of the present invention, the pitting corrosion resistance, the cracking resistance, and the strength performance are degraded. Also, Po is so small that the welding performance is degraded as a whole.

In Comparative example 21, the amount of C within the sheath exceeds the prescribed range, and the amount of Si is so large that cracking resistance is degraded. Furthermore, the spatter quantity increases, and the apparent density of the mixed flux is so low that the mechanical performance of weld metal is degraded.

In Comparative example 22, the amount of $TiO_2+SiO_2+ZrO_2+Al_2O_3$, the amount of metal fluoride (converted value of F), and Po each exceed the prescribed ranges. Therefore, when welding performance is evaluated, the arc stability is poor. Also, spatter quantity increases, and the detachability of slag is degraded. In addition, the cracking resistance and the strength performance are degraded.

In Comparative example 23, the amount of Si exceeds the prescribed range of embodiments of the present invention. Therefore, when welding performance is evaluated, the detachability of slag is poor. Additionally, the bead appearance and the cracking resistance are degraded, and the amount of metal fluoride is so small that the covering property of slag is degraded.

In Comparative example 24, the amount of C within the sheath exceeds the prescribed range, and the amount of Ni deviates from the prescribed range such that the pitting corrosion resistance, the cracking resistance and the strength performance are degraded. Also, the spatter quantity increases.

In Comparative example 25, since the amount of Cu exceeds the prescribed range of the invention, the cracking resistance is degraded. In addition, the amount of $Li_2+K_2O+Na_2O$ is so small that arc is unstable. Furthermore, the covering property of slag and the bead appearance are poor.

In Comparative example 26, the amount of P+S+Co+B+Bi within the sheath exceeds the prescribed range of embodiments of the present invention, and the filling rate also exceeds the prescribed range. Therefore, when welding performance is evaluated, the spatter quantity increases. Also, the pitting corrosion resistance, the cracking resistance, and the strength performance are degraded, and the productivity is reduced.

In Comparative example 27, the amount of $TiO_2+SiO_2+ZrO_2+Al_2O_3$ is less than the prescribed range of embodiments of the present invention, and the amount of $Li_2+K_2O+Na_2O$ exceeds the prescribed range. Therefore, when welding performance is evaluated, the arc stability is poor, spatter quantity increases, and the detachability and the covering property of slag are poor. The amount of Mo is so small that the cracking resistance and the strength are degraded. P1 deviates from the prescribed range of embodiments of the present invention such that the productivity is degraded.

In Comparative example 28, the amount of N compound (converted value of N) and the amount of the other oxides filled into the wire each exceed the prescribed ranges. Therefore, the cracking resistance and the strength performance are degraded, the covering property of slag is poor, and the spatter quantity increases.

In Comparative example 29, the amount of Mo and the amount of Ni each exceed the prescribed range of embodiments of the present invention. Therefore, the cracking performance and the strength performance are degraded. The amount of the other oxides is so small that the detachability and covering property of slag are degraded.

In Comparative example 30, the amount of Cr and the amount of Mn each exceed the prescribed ranges of embodiments of the present invention, and the apparent density and the particle-size distribution of the mixed flux also each exceed the prescribed ranges. Therefore, when welding performance is evaluated, the arc stability is poor, the spatter quantity increases, and the bead appearance is degraded. Also, the cracking resistance and drawability are degraded.

According to embodiments of the present invention, the amounts of Cr, Ni, Mo, and N, which are basic chemical components of the flux cored wire for duplex stainless steel, can be specified in ranges such that the mechanical performance of weld metal and welding performance are not reduced. Simultaneously, the amount of Cu within the wire can be controlled, and the parameter represented by Po can be regulated. Therefore, it is possible to improve the pitting corrosion resistance and to enhance the mechanical performance of weld metal and welding performance.

Furthermore, C and P+S+Co+B+Bi within the sheath can be controlled so that the pitting corrosion resistance and the cracking resistance are enhanced.

In addition, the amounts of $TiO_2+SiO_2+ZrO_2+Al_2O_3$, $Li_2O+K_2O+Na_2O$, other oxides, and metal fluoride (converted value of F) within the filled flux can be regulated so that better welding performance can be achieved.

Moreover, as the apparent densities and particle-size characteristics of mixed fluxes are properly controlled, cutting of a wire during manufacturing can be inhibited, which can help make it possible to secure optimal productivity. In addition, it is possible to provide a flux cored wire for duplex stainless steel which is relatively inexpensive.

While few exemplary embodiments of the present invention have been shown and described, it will be appreciated by those skilled in the art that various changes may be made to these embodiments without departing from the spirit and scope of the invention as defined by the appended claims and their equivalents.

What is claimed is:

1. A flux cored wire for duplex stainless steel comprising a sheath and a flux filled into the sheath,
   wherein the flux cored wire comprises about 24.0-30.0 wt % Cr, about 7.0-10.5 wt % Ni, about 2.0-4.0 wt %) molybdenum, about 0.10-2.50 wt % Cu, about 0.40-1.00 wt % Si, about 1.5-3.0 wt % Mn, about 0.10-0.30 wt % N compound (converted value of N), and the remainder including iron Fe and inevitable impurities on the basis of a total weight of the wire;
   the flux comprises about 6.50-12.00 wt % of $TiO_2+SiO_2+ZrO_2+Al_2O_3$, about 0.10-0.50 wt % of $Li_2O+K_2O+Na_2O$, about 0.10-2.00 wt % of other oxides, and about 0.10-0.50 wt % of metal fluoride (converted value of F) on the basis of the total weight of the wire; and
   the flux is filled into the sheath at a ratio of about 26-35%.

2. The flux cored wire according to claim 1,
   wherein the sheath comprises about 0.015 wt % or less of C, about 0.10% or less of P+S+Co+B+Bi, and the remainder including Fe and inevitable impurities on the basis of the total weight of the sheath.

3. The flux cored wire according to claim 2,
   wherein a total amount Po (wt %) of oxygen supplied by $TiO_2+SiO_2+ZrO_2+Al_2O_3$, $Li_2O+K_2O+Na_2O$, and the other oxides within the flux filled into the sheath, which is expressed by the following equation, satisfies a range of about 3.00-5.20 wt % on the basis of the total weight of the wire:

$$Po = \sum_{i=1}^{n}(Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

4. The flux cored wire according to claim 1,
   wherein a total amount Po (wt %) of oxygen supplied by $TiO_2+SiO_2+ZrO_2+Al_2O_3$, $Li_2O+K_2O+Na_2O$, and the other oxides within the flux filled into the sheath, which is expressed by the following equation, satisfies a range of about 3.00-5.20 wt % on the basis of the total weight of the wire:

$$Po = \sum_{i=1}^{n}(Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

5. The flux cored wire according to claim 1,
   wherein an apparent density of the flux is about 3.50 g/L to about 4.50 g/L.

6. The flux cored wire according to claim 1,
   wherein particles of the mixed flux can all pass through a 60-mesh standard sieve, and wherein a ratio (P1) of the particles of the mixed flux which cannot pass through a 230-mesh standard sieve to the particles of the mixed flux with can pass through a 230-mesh standard sieve is from about 65% to about 85%.

7. A method of manufacturing a flux cored wire for duplex stainless steel including a sheath and a flux filled into the sheath, the method comprising filling a mixed flux into the sheath;
   wherein the flux cored wire comprises about 24.0-30.0 wt % Cr, about 7.0-10.5 wt % Ni, about 2.0-4.0 wt % Mo), about 0.10-2.50 wt % Cu, about 0.40-1.00 wt % Si, about 1.5-3.0 wt % Mn, about 0.10-0.30 wt % N compound (converted value of N), and the remainder including iron (Fe) and inevitable impurities on the basis of a total weight of the wire;
   the flux comprises about 6.50-12.00 wt % of $TiO_2+SiO_2+ZrO_2+Al_2O_3$, about 0.10-0.50 wt % of $Li_2O+K_2O+Na_2O$, about 0.10-2.00 wt % of other oxides, and about 0.10-0.50 wt % of metal fluoride (converted value of F) on the basis of the total weight of the wire; and the flux is filled into the sheath at a ratio of about 26-35%.

8. The method according to claim 7,
wherein the sheath comprises about 0.015 wt % or less of C, about 0.10% or less of P+S+Co+B+Bi, and the remainder including Fe and inevitable impurities on the basis of the total weight of the sheath.

9. The method according to claim 8,
wherein a total amount Po (wt %) of oxygen supplied by $TiO_2+SiO_2+ZrO_2+Al_2O_3$, $Li_2O+K_2O+Na_2O$, and the other oxides within the flux filled into the sheath, which is expressed by the following equation, satisfies a range of about 3.00-5.20 wt % on the basis of the total weight of the wire:

$$Po = \sum_{i=1}^{n} (Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

10. The method according to claim 7,
wherein a total amount Po (wt %) of oxygen supplied by $TiO_2+SiO_2+ZrO_2+Al_2O_3$, $Li_2O+K_2O+Na_2O$, and the other oxides within the flux filled into the sheath, which is expressed by the following equation, satisfies a range of about 3.00-5.20 wt % on the basis of the total weight of the wire:

$$Po = \sum_{i=1}^{n} (Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

11. The method according to claim 7,
wherein an apparent density of the flux is about 3.50 g/L to about 4.50 g/L.

12. The method according to claim 7,
wherein particles of the mixed flux can all pass through a 60-mesh standard sieve, and wherein a ratio (P1) of the particles of the mixed flux which cannot pass through a 230-mesh standard sieve to the particles of the mixed flux with can pass through a 230-mesh standard sieve is from about 65% to about 85%.

13. A method of manufacturing a flux cored wire for duplex stainless steel including a sheath and a flux filled into the sheath, the method comprising filling a mixed flux into the sheath;
wherein an apparent density of the mixed flux is about 3.50 g/L to about 4.50 g/L; and wherein particles of the mixed flux can all pass through a 60-mesh standard sieve; and
wherein a ratio of the particles of the mixed flux which cannot pass through a 230-mesh standard sieve to the particles of the mixed flux with can pass through a 230-mesh standard sieve is from about 65% to about 85%;
wherein the flux cored wire comprises about 24.0-30.0 wt % Cr, about 7.0-10.5 wt % Ni, about 2.0-4.0 wt % molybdenum), about 0.10-2.50 wt % Cu, about 0.40-1.00 wt % Si, about 1.5-3.0wt % Mn, about 0.10-0.30 wt % N compound (converted value of N), and the remainder including iron (Fe) and inevitable impurities on the basis of a total weight of the wire;
the mixed flux comprises about 6.50-12.00 wt % of $TiO_2+SiO_2+ZrO_2+Al_2O_3$, about 0.10-0.50 wt % of $Li_2O+K_2O+Na_2O$, about 0.10-2.00 wt % of other oxides, and about 0.10-0.50 wt % of metal fluoride (converted value of F) on the basis of the total weight of the wire; and
the mixed flux is filled into the sheath at a ratio of about 26-35%.

14. The method according to claim 13,
wherein the sheath comprises about 0.015 wt % or less of C, about 0.10% or less of P+S+Co+B+Bi, and the remainder including Fe and inevitable impurities on the basis of a total weight of the sheath.

15. The method according to claim 14,
wherein a total amount Po (wt %) of oxygen supplied by oxides within the mixed flux filled into the sheath, which is expressed by the following equation, satisfies a range of about 3.00-5.20 wt % on the basis of the total weight of the wire:

$$Po = \sum_{i=1}^{n} (Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

16. The method according to claim 13,
wherein a total amount Po (wt %) of oxygen supplied by oxides within the flux filled into the sheath, which is expressed by the following equation, satisfies a range of about 3.00-5.20 wt % on the basis of a total weight of the wire:

$$Po = \sum_{i=1}^{n} (Xi \times \delta i),$$

where Po represents the total amount (wt %) of oxygen supplied by oxides within the flux filled into the sheath on the basis of the total weight of the wire, i represents an oxide within the flux filled into the sheath, n represents the number of oxides within the flux filled into the sheath, Xi represents the weight (%) of an oxide within the flux filled into the sheath on the basis of the total weight of the wire, and δi represents a percentage of oxygen atoms included in an oxide i within the flux.

* * * * *

UNITED STATES PATENT AND TRADEMARK OFFICE
CERTIFICATE OF CORRECTION

PATENT NO. : 8,153,935 B2
APPLICATION NO. : 11/875620
DATED : April 10, 2012
INVENTOR(S) : Jong Hun Jang and Sang Jun Hur Page 1 of 2

It is certified that error appears in the above-identified patent and that said Letters Patent is hereby corrected as shown below:

IN THE SPECIFICATIONS:

Column 5,
Line 10, "a 6 phase" should read --a σ phase--.
Line 38, "a 6 phase" should read --a σ phase--.

Column 6,
Line 59, "may not stabilized" should read --may not stabilize--.

Column 7,
Lines 57-58, "can occurs" should read --can occur--.

Column 11,
Line 28, "set tip" should read --set up--.

Column 13,
"Metal fluoride (converted value of F)" column corresponding to Division "5", "0.26." should read --0.26--.

IN THE CLAIMS:

Column 19,
Line 48, claim 1, "2.0-4.0 wt %)" should read --2.0-4.0 wt%--.

Column 20,
Line 57, claim 7, "2.0-4.0 wt % Mo)," should read --2.0-4.0 wt% Mo,--.

Column 21,
Line 59, claim 12, "flux with can" should read --flux which can--.

Signed and Sealed this
Third Day of July, 2012

David J. Kappos
*Director of the United States Patent and Trademark Office*

Column 22,
Line 3, claim 13, "flux with can" should read --flux which can--.
Line 7, claim 13, "molybdenum)," should read --molybdenum,--.